United States Patent
Lundh et al.

(10) Patent No.: US 9,572,203 B2
(45) Date of Patent: Feb. 14, 2017

(54) CONTROL SYSTEM FOR A MELTING PROCESS

(71) Applicant: ABB Research Ltd., Zurich (CH)

(72) Inventors: Michael Lundh, Vasteras (SE); Xiaojing Zhang, Vasteras (SE)

(73) Assignee: ABB Research Ltd., Zurich (CH)

(*) Notice: Subject to any disclaimer, the term of this patent is extended or adjusted under 35 U.S.C. 154(b) by 27 days.

(21) Appl. No.: 14/490,366

(22) Filed: Sep. 18, 2014

(65) Prior Publication Data

US 2015/0003488 A1 Jan. 1, 2015

Related U.S. Application Data

(60) Division of application No. 14/158,497, filed on Jan. 17, 2014, now Pat. No. 8,888,888, which is a (Continued)

(51) Int. Cl.
F27B 3/28 (2006.01)
F27D 19/00 (2006.01)
(Continued)

(52) U.S. Cl.
CPC ............. H05B 7/144 (2013.01); C21C 5/5211 (2013.01); C21C 5/5217 (2013.01); F27B 3/28 (2013.01);
(Continued)

(58) Field of Classification Search
CPC ........... H05B 7/144; H05B 7/148; H05B 7/08; F27B 3/085; F27B 3/28; F27D 19/00; F27D 21/00
See application file for complete search history.

(56) References Cited

U.S. PATENT DOCUMENTS 5,956,366 A * 9/1999 Shimizu .................. F27D 11/08
373/107
6,026,113 A 2/2000 Pavlicevic et al.
(Continued)

FOREIGN PATENT DOCUMENTS

EP 0228024 A2 7/1987
JP H09194926 A 7/1997
(Continued)

OTHER PUBLICATIONS

Kikuma Izumi, Masakatsu Naruse, Control System for DC arc furnace, electric steel making, Japan, Research Society of Electric Steel Making, Jul. 1991, vol. 62, No. 3, pp. 198-203.
Stal Robert et al., Electromagnetic stirring in electric arc furnace, Stahl and Eisen, Germany, Verlag Stahleisen GmbH, Nov. 2009, vol. 129, No. 11, S67-S68 and S71.
International Preliminary Report on Patentability Application No. PCT/EP2011/062234 Completed: Aug. 1, 2013 22 pages.
International Search Report and Written Opinion of the International Searching Authority Application No. PCT/EP2011/062234 Completed: Jun. 26, 2012; Mailing Date: Jul. 4, 2012 12 pages.
Notice of Reasons for Rejection Application No. 2014-511749 Issued: May 20, 2014 2 pages.
(Continued)

*Primary Examiner* — George Wyszomierski
*Assistant Examiner* — Tima M McGuthry Banks
(74) *Attorney, Agent, or Firm* — Whitmyer IP Group LLC (57) ABSTRACT

Disclosed is a control system for a melting process in an electric arc furnace for melting a metallic material that minimizes desired process properties such as the melting time or the total power consumption of the melting process. The system includes a processing unit adapted for receiving or collecting measured data of at least one process variable, determining the current state of the process, performing an optimization of the melting process, determining a process input based on the result of the optimization, and controlling the melting process with the process input. A method is also presented herein.

13 Claims, 3 Drawing Sheets

Related U.S. Application Data continuation of application No. PCT/EP2011/062234, filed on Jul. 18, 2011.

(51) Int. Cl.
| | | |
|---|---|---|
| *F27D 21/00* | (2006.01) | |
| *H05B 7/144* | (2006.01) | |
| *H05B 7/148* | (2006.01) | |
| *C21C 5/52* | (2006.01) | |
| *H05B 7/18* | (2006.01) | |
| *F27D 27/00* | (2010.01) | |

(52) U.S. Cl.
CPC ............... *F27D 19/00* (2013.01); *F27D 21/00* (2013.01); *H05B 7/148* (2013.01); *H05B 7/18* (2013.01); *C21C 2005/5288* (2013.01); *C21C 2300/06* (2013.01); *F27D 27/00* (2013.01); *Y02P 10/216* (2015.11); *Y02P 10/256* (2015.11); *Y02P 10/259* (2015.11); *Y02P 10/286* (2015.11)

(56) References Cited

U.S. PATENT DOCUMENTS

| | | |
|---|---|---|
| 2004/0244530 A1 | 12/2004 | Saucedo |
| 2007/0133651 A1 | 6/2007 | Gerhan et al. |
| 2008/0047396 A1* | 2/2008 | Burty ................ C21O 5/34 75/375 |
| 2013/0269483 A1 | 10/2013 | Eriksson et al. |

FOREIGN PATENT DOCUMENTS

| | | |
|---|---|---|
| JP | 2003130547 A | 5/2003 |
| SU | 865926 A1 | 9/1981 |
| WO | 2012034586 A1 | 3/2012 |

OTHER PUBLICATIONS

Clerici, et al.; "Tenova's intelligent arc furnace iEAF—Concept and technical overview"; Steel Times International; 2008; pp. 19-24.

* cited by examiner

CONTROL SYSTEM FOR A MELTING PROCESS

FIELD OF THE INVENTION

The present invention generally relates to a method and a control system for controlling a melting process in an electric arc furnace (EAF) comprising one or more electrodes for melting metal or metal alloys and an electromagnetic stirrer (EMS) for stirring the melt.

BACKGROUND OF THE INVENTION

Electric arc furnace (EAF) steelmaking is a highly energy-intensive industrial process. It consumes a large amount of electrical and chemical energy. A modern EAF produces over 300 tapping tons of steel pear heat, and since the production of steel in an EAF requires a huge amount of electrical and chemical energy, the energy cost for one such furnace annually is very high. This is the reason why the latest EAF technology development has been mainly focused on reducing the energy consumption (electricity and oxygen) and thereby increasing the productivity. Also from an environmental point of view there is a desire to reduce the emissions of carbon dioxide and other emissions from the EAF.

A typical electric arc furnace comprises three electrodes, a power supply system operatively connected to the electrodes, a vessel, often water-cooled in larger sizes, covered with a retractable roof through which one or more graphite electrodes enter the furnace. Further an electric arc furnace usually comprises a cooling water station and at least one control unit operatively connected to the power supply system to control the operation of the electrodes. The electrodes form an arc between the metallic material (e.g. scrap), which has been loaded into the EAF, and the electrodes. Thereby, a metallic melt (a charge) is created which is heated both by current passing through the melt and by the radiant energy evolved by the arc. An electrode regulating system maintains approximately constant current and power input during the melting of the charge.

Arc furnaces usually exhibit a pattern of hot and cold-spots around the hearth perimeter, with the cold-spots located between the electrodes. Modern furnaces mount gas burners in the sidewalls and use them to provide chemical energy to the cold-spots, making the heating of the melt more uniform. Additional chemical energy is also provided by means, e.g. lances, for injecting oxygen and carbon into the furnace.

A typical EMS-system comprises at least one electromagnetic stirrer comprising a stirring coil, a power supply system, comprising frequency converter and a transformer, operatively connected to the stirrer, a cooling water station and at least one control unit operatively connected to the power supply system to control the operation of the stirrer. The stirring coil is typically mounted outside a steel shell of the furnace. This coil generates a travelling magnetic field to provide stirring forces in the melt of molten metal. The stirrer operates using a low frequency travelling magnetic field, penetrating the steel shell of the furnace and thereby moving the melt.

US 2004/244530 A1 discloses a method of controlling slag characteristics in an electric arc furnace control. The furnace has inputs including oxygen supply and carbon supply. The method of controlling slag characteristics includes introducing a charge to be melted into the furnace, melting at least a portion of the charge to produce a melt, and introducing oxygen and carbon into the melt to enhance formation of a slag having slag conditions including a slag height and a slag coverage. To better control the slag characteristics, the slag is modeled and the inputs are controlled to maximize the energy transferred from the electrode to the slag.

US 2007/133651 A1 discloses a method for controlling the foaming of slag in an electric arc furnace. The furnace comprises at least one electrode column. Current is applied to the electrode column, causing an arc to form between the tip of the electrode column and the scrap, melting the scrap. Impurities in the molten scrap metal rise to the surface forming slag. A meter determines the total harmonic distortion associated with the system. If the total harmonic distortion is greater than a predetermined set point, and the scrap metal is sufficiently molten, then a foaming agent is added thereto.

The publication "Tenova's intelligent arc furnace iEAF—concept and technical overview" by Clerci et al., published in Steel Times International, DMG World Media, Lewes, G B, vol. 32, no. 4, 1 May 2008, pp. 19-23, discloses an automation system based on continuous, real-time process measurements and online process models, developed for the dynamic control and optimization of the electric arc furnace.

SUMMARY OF THE INVENTION

It is an object of the present disclosure to reduce the EAF total cycle time and to increase the yield of iron. Thereby the electrode and stirrer power consumption as well as the addition of chemical energy (i.e. oxygen, carbon and burner-gas) is reduced and thus the EAF productivity is increased.

Hence, in a first aspect of the present disclosure there is provided a method of controlling a melting process in an electric arc furnace for melting a metallic material, wherein the method comprises:
  i) receiving measurements of at least one process variable reflecting the melting process,
  ii) determining a current state of the melting process based on a model of the melting process, a previous state of the melting process, a previous control input, and the measurements of the at least one process variable,
  iii) determining a current process input which minimizes a desired process property, wherein the determining comprises minimizing the desired process property with respect to all allowed values of process inputs and utilizing constraints involving the current state of the melting process and a desired end state of the melting process,
  iv) controlling the melting process utilizing the current process input, and
  v) repeating steps i) to iv) until the desired end state of the melting process has been obtained.

In a second aspect there is provided a method, which is characterized by:
  defining an optimization problem including a state model of the melting process which relates process inputs, including power supply to the stirrer, to at least one state of the process, a loss function subject to the state model and an initial start condition,
  performing an optimization of the melting process with regard to time and/or energy consumption including determining the state of the process based on the optimization problem using the initial start condition, determining reference values of a control signal for the power supply to the stirrer based on the result of the optimization, using the control signal for controlling the power supply to the stirrer, collecting measured data of at least one process variable reflecting the melting process, determining the current state of the process based on the state model, the determined previous state, and the determined previous control signal, determining a corrected current state of the process based on the measured data using a state observer, performing an optimization of the melting process with regard to time and/or energy consumption based on the optimization problem using the corrected current state as start condition for the optimization, repeating the above steps during the process until a desired state of the process has been achieved.

Thereby improved melting of metallic material is achieved which will improve the metallurgy reactions and thereby the operating cycle time is reduced. Energy saving, electrical and chemical, at a quantifiable amount can be achieved and the EAF productivity is increased.

According to an embodiment of the invention the electric arc furnace comprises one or more electrodes for melting a metallic material, the process inputs of the state model further includes power supply to the electrodes and the step of determining reference values further includes determining reference values of a control signal for the power supply to the electrodes based on the result of the optimization, and the step of using further includes using said determined control signal for the power supply to the electrodes for controlling the power supply to the electrodes.

According to a further embodiment of the invention the electric arc furnace comprises an injection unit arranged for supplying oxygen to the melt, the process inputs of the state model further includes oxygen supply to the injection unit, and the step of determining reference values further includes determining reference values of a control signal for the oxygen supply to the injection unit based on the result of the optimization, and the step of using further includes using the control signal for controlling the oxygen supply to the injection unit.

According to a further embodiment of the invention the electric arc furnace comprises at least one gas burner arranged for heating the melt, the process inputs of the state model further includes burner gas supply to the gas burner and the step of determining reference values further includes determining reference values of a control signal for the burner gas supply to the gas burner based on the result of the optimization, and the step of using further includes using the control signal for controlling the burner gas supply to the gas burner.

According to a further embodiment of the invention the electric arc furnace comprises means for adding carbon powder into the melt, the process inputs of the state model further includes carbon powder supply to said means and the step of determining reference values further includes determining reference values of a control signal for the carbon powder supply to said means based on the result of the optimization, and the step of using further includes using the control signal for controlling the carbon powder supply to said means.

The object of the invention is also obtained by the control system for controlling a melting process in an electrical arc furnace which is characterized in that the control system comprises a stirrer control unit, operatively connected to the power supply unit of the stirrer, for controlling the power supply in response to control values for the power supply to the stirrer and at least one sensor arranged to measure the power supply to the stirrer. The control system further comprises a processing unit arranged to receive measured data regarding the process variables from the at least one sensor arranged to measure the power supply to the stirrer and to perform an optimization of the melting process with regard to time and/or energy consumption based on a predefined optimization problem including a state model of the melting process which relates process inputs, including power supply to the stirrer, to at least one state of the process, a loss function subject to said state model and an initial start condition. The processing unit is further arranged to determine the state of the process based on the optimization problem using the initial start condition, and arranged to perform the following steps:

determining reference values of a control signal for the power supply to the stirrer based on the result of the optimization, providing said reference values to the stirrer control unit for controlling the stirring of the metallic material, collecting measured data of at least one process variable reflecting the melting process, determining the current state of the process based on the state model, the determined previous state, and the determined previous control signal, determining a corrected current state of the process based on the measured data using a state observer, performing an optimization of the melting process with regard to time and/or energy consumption based on said optimization problem using the corrected current state as start condition for the optimization, and repeating the above steps during the process until a desired state of the process has been achieved.

BRIEF DESCRIPTION OF THE DRAWINGS

Other features and advantages of the present invention will become more apparent to a person skilled in the art from the following detailed description in conjunction with the appended drawing in which.

DETAILED DESCRIPTION OF THE INVENTION

Figure 1:
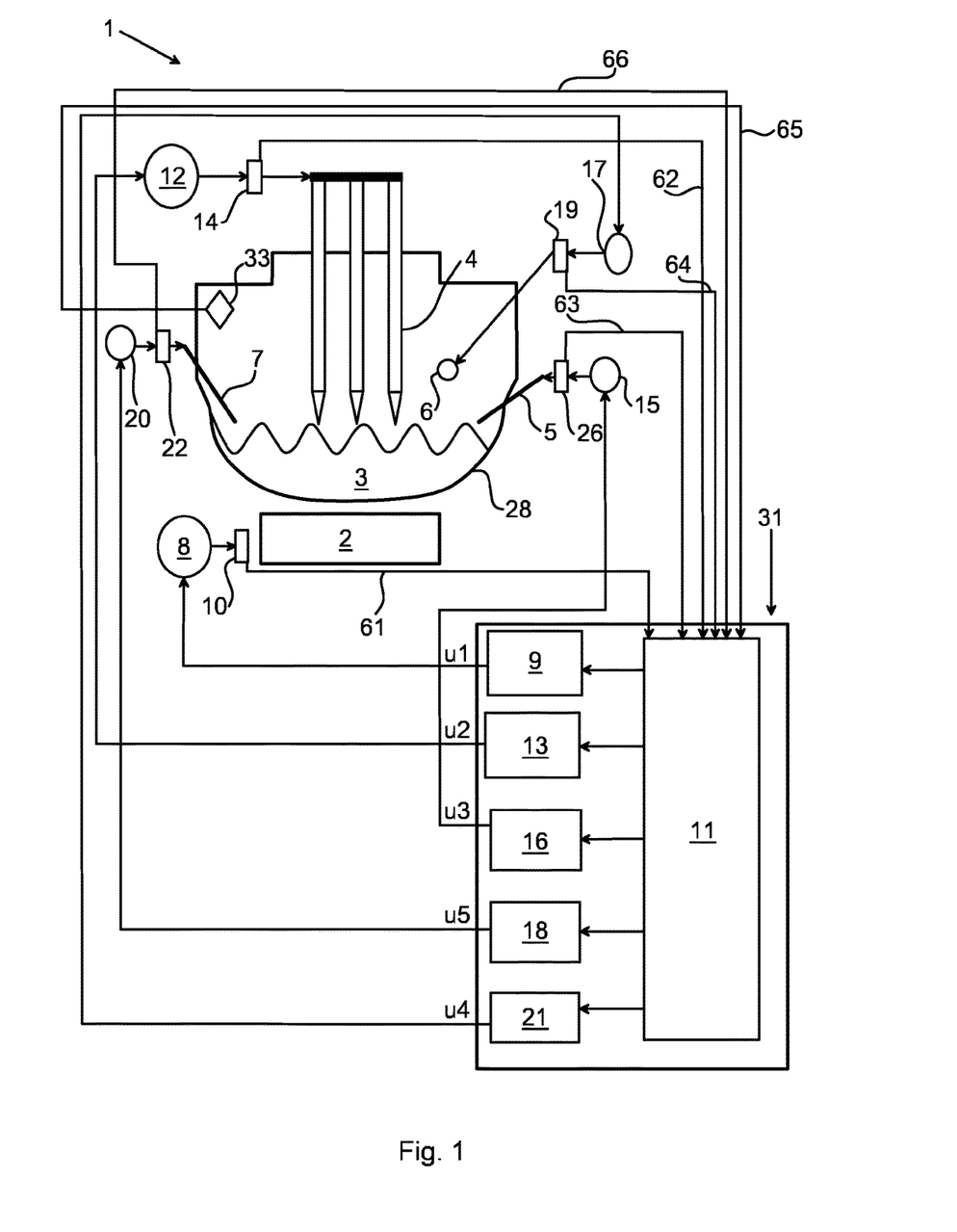
FIG. 1 shows a cross section of an electric arc furnace according to one embodiment of the invention.

FIG. 1 illustrates an electrical arc furnace 1 (the EAF may be a DC EAF or an AC EAF and is hereinafter called EAF) arranged for melting metallic material such as scrap being loaded into the EAF prior to the beginning of the melting process. The EAF further comprises one or more electrodes 4, a vessel 28 covered with a retractable roof through which the one or more graphite electrodes 4 enter the furnace 1 and a power supply system 12 operatively connected to the electrodes. At least one apparatus for electromagnetic stirring 2 (hereinafter called stirrer) of molten metal 3 in the EAF 1 is arranged on an outer surface, preferably the bottom surface, of the EAF vessel 28.

A power supply system 8 is operatively connected to the stirrer 2. The power supply system 12 operatively connected to the electrodes 4 and the power supply system 8 operatively connected to the stirrer 2 may be two separate power supply systems, but it can also be the same system for both purposes. At least one control unit 31, including hardware, one or more memory units, one or more processing units 11 (i.e. processors), and software, is operatively connected to the power supply system 8 to control the operation of the stirrer 2. The at least one control unit 31 (e.q., control system), arranged to control the stirrer 2 and the electrodes 4, is operatively connected to the power supply system 8 and may also be connected to the power supply system 12 to control the operation of the electrodes 4, however a separate control system can also be arranged for this purpose.

The EAF 1 operation starts with the furnace being charged with scrap metal, wherein the meltdown commences. The electrodes 4 are lowered onto the scrap and an arc is struck thereby starting to melt the scrap. Lower voltages are selected for this first part of the operation to protect the roof and walls of the furnace from excessive heat and damage from the arcs. Once the electrodes 4 have reached the heavy melt at the base of the furnace and the arcs are shielded by slag the voltage can be increased and the electrodes 4 are raised slightly, thereby lengthening the arcs and increasing power to the melt. This enables a molten pool of metal to form more rapidly, reducing tap-to-tap times. Injection units 5 are arranged in the EAF walls or bottom for injecting oxygen provided by oxygen supply unit 15 into the molten metal. One or more gas burners 6 (and gas burner supply unit 17) are arranged in EAF to provide extra chemical heat to the scrap and the molten metal inside the EAF. Both processes accelerate the scrap meltdown. Also means for injecting carbon 7 (e.g., injection units) provided by carbon supply unit 20 into the molten metal 3 are arranged in the EAF 1. The stirrer 2 is arranged to accelerate the molten metal 3 which will further accelerate the scrap meltdown and the tap-to-tap times.

The concept of an integrated EAF control is to control the EAF 1 in such a way that stirring control 9, oxygen injection unit (e.g. a lance) control 16 (e.g., oxygen flow control unit), gas burner control 21 (e.g., gas burner flow control unit), off-gas control 18 (e.g., carbon flow control unit), and electrode power supply control 13 are all integrated as one control strategy.

Figure 3:
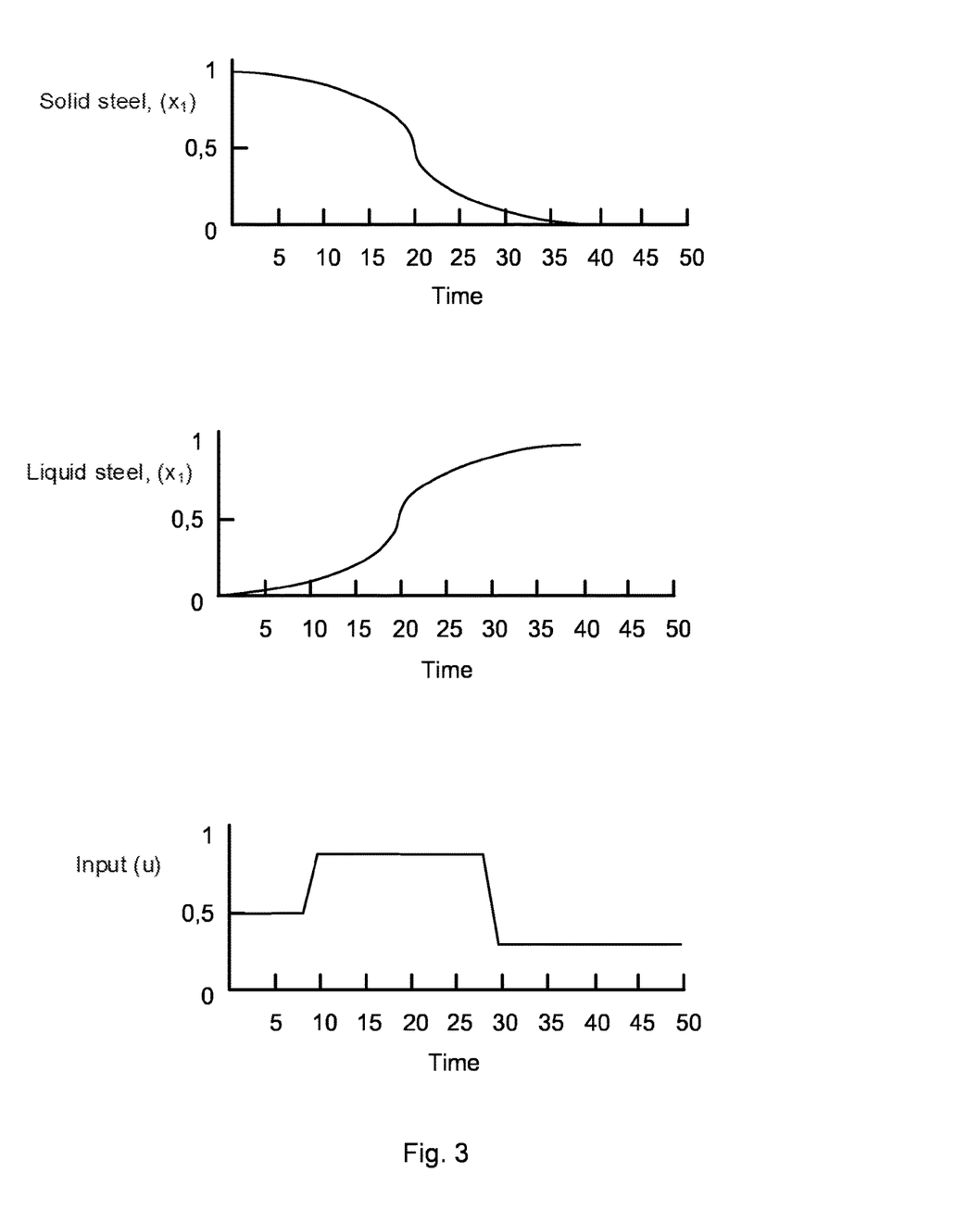
FIG. 3 shows possible melting profiles, where the amount of solid ($x_1$) and liquid ($x_2$) steel is shown together with one of the process inputs ($u_1$, $u_2$, $u_3$, $u_4$, $u_5$) that affect the EAF, according to an embodiment of the invention.

Given is an initial state where the EAF is loaded with metallic material (i.e. scrap) ($x_1$, $x_2$, etc.) for t=0, and by solving the optimization problem as shown below, reference values for the process inputs u for $0 \leq t \leq t_f$ can be determined.

$$\min_u t_f \quad \text{(loss function)}$$

Subject to $$x(k+1) = f_s(x(k), u(k), d(k)) \quad \text{(state model of the melting process)}$$

$$x(t_f) = x_f \quad \text{(end condition/end state)}$$

$$x(0) = x_0 \quad \text{(start condition/initial state)}$$

$$x_l \leq x \leq x_h$$

$$u_l \leq u \leq h_h$$

By solving the above problem, the process will beneficially change from the initial state x(0), which like any state typically is a vector, to the desired end state in shortest possible time. Hence, optimal process inputs are determined at the time when melting of the metallic material begins. For each instant $t_k$ during the melting process the appropriate process input $u(t_k)$ is applied to the process. This approach relies on the state model of the melting process which relates process inputs (such as power supply to the stirrer or to the electrodes, oxygen flow, burner-gas flow or injected carbon) to at least one state (x) of the process, a loss function subject to the state model and an initial start condition, since no feedback from the real EAF is used. Once the initial start condition $x_0$ has been defined it is used to perform an optimization of the melting process with regard to time and/or energy consumption including determining the state of the process based on the optimization problem presented above.

Figure 2:
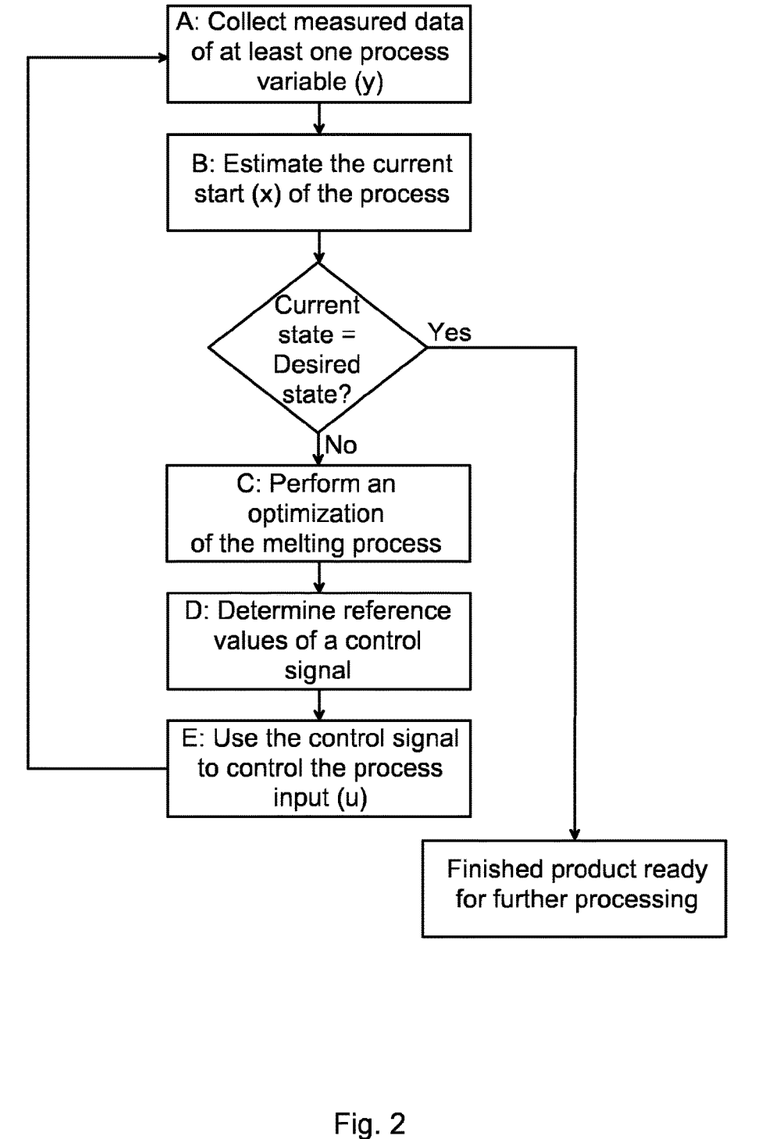
FIG. 2 shows a flowchart of the melting process according to one embodiment of the invention.

Provided that measurements of one or more process variable is available, information about the current state of the melting process can be obtained by estimations based on the measurements of the one or more process variables, allowing for the previous procedure to be repeated on regular or non-regular intervals until a desired state of the process has been achieved. In one embodiment, the steps at each interval are:

A) collecting or receiving measurements of at least one process variable $y(t_k)$ reflecting the melting process, B) determining the current state of the process by means of estimation, based on the state model, the determined previous state $\hat{x}(t_{k-1})$, the determined previous control signal $u(t_{k-1})$, and the measurements $y(t_k)$ of the at least one process variable. A state observer (e.g. a moving horizon estimator or an extended Kalman filter) can be used to determine an estimation of the current state $\hat{x}(t_k)$ of the melting process.

C) solving the above optimization problem with regard to the time and/or energy consumption using the estimated current state $\hat{x}(t_k)$ as the start condition for the optimization. The result of this optimization will be reference values of the control signals (process inputs) u(t) for $t_k \leq t \leq t_f$. Apply the first control signal in the obtained reference value, $u(t_k)$, to the process, D) determining reference values of a control signal for the process input ($u_x$) based on the result of the optimization of the melting process, E) using the control signal for controlling the process input ($u_x$) and thus the melting process, and F) repeating this procedure (steps A-E) during the process until a desired state $x(t_f)$ of the process has been achieved. In each iteration the estimated state $\hat{x}(t_k)$ replaces the initial state $x_0$. Thus, in each iteration $\hat{x}(t_k) = x_{t_k}$ is set as the initial condition.

Once the desired state of the process has been achieved the molten metal is tapped from the EAF for further processing, e.g. a continuous casting process.

Possible process inputs and process variables of an EAF subject to control are listed in the tables below.

Process Input ($u_x$) Description

| | |
|---|---|
| u1 | Power supply to the stirrer/EMS power |
| u2 | Power supply to the electrodes/Electric arc power |
| u3 | Oxygen flow (through injection unit, e.g. a lance) |
| u4 | Burner gas flow (oxygen + fuel) |
| u5 | Carbon injected |

Examples of process variables are listed in the table below.

Process Variables Description

| | |
|---|---|
| y1 | Flue gas temperature |
| y2 | Flue gas concentration |
| y3 | Cooling water temperature (stirrer and/or furnace) |
| y4 | Wall temperature |
| y5 | Melt temperature (if possible) |

If the process variables $d_{(t)}$ are known functions in time, it would be possible to calculate values for the control variables $u_{(t)}$ that minimizes the energy or time consumption for the melting process.

In the Model Predictive Control (MPC)/feedback case, i.e. when a moving horizon estimator is used, examples of process variables d(k) are measurable signals that affect the process but which are not determined in the optimization. Such signals can for instance be measurable disturbances associated with the melting process.

Examples of the current state of the process are at least one of the states listed in the table below State Description

| | |
|---|---|
| x1 | Quantity of solid metallic material (kg) |
| x2 | Quantity of liquid metallic material (kg) |
| x3 | Carbon in solution in metallic material (kg) |
| x4 | Silicon in solution in metallic material (kg) |
| x5 | Solid slag quantity (kg) |
| x6 | Liquid slag quantity (kg) |
| x7 | Quantity of FeO in slag (kg) |
| x8 | Quantity SiO$_2$ in slag (kg) |
| x9 | Concentration of carbon-monoxide (kg) in flue gas |
| x10 | Concentration of carbon-dioxide (kg) in flue gas |
| x11 | Nitrogen in gas-phase (kg) |
| x12 | Solid temperature (K) |
| x13 | Furnace relative pressure (Pa) |

Generally, energy savings related to EAF-technology can be divided into two types, e.g. metallurgical process improvements, such as oxygen supply, scrap preheating, post-combustion and bottom gas stirring, or EAF process and operation automation, e.g. electrode regulation or melt down control.

A major component of EAF slag is iron oxide from steel combusting with the injected oxygen. Later in the heat, carbon (in the form of coke or coal) is injected into this slag layer, reacting with the iron oxide to form metallic iron and carbon monoxide gas, which then causes the slag to foam, allowing greater thermal efficiency, and better arc stability and electrical efficiency. Once flat bath conditions are reached, i.e. the scrap has been completely melted, refining operations take place to check and correct the steel chemistry and superheat the melt above its freezing temperature in preparation for tapping. More slag formers are introduced and more oxygen is blown into the bath, burning out impurities such as silicon, sulfur, phosphorus, aluminum, manganese and calcium, and removing their oxides to the slag. Removal of carbon takes place after these elements have burnt out first, as they have a greater affinity for oxygen. Metals that have a poorer affinity for oxygen than iron, such as nickel and copper, cannot be removed through oxidation and must be controlled through scrap chemistry alone, such as introducing the direct reduced iron and pig iron. A foaming slag is maintained throughout, and often overflows the furnace to pour out of the slag door into the slag pit.

Expressed in an alternative way the inventive concept provides a method of controlling a melting process in an electric arc furnace, wherein the method comprises the steps of:
i) receiving measurement data of at least one process variable associated with the melting process,
ii) determining a current state of the melting process based on a previous state of the melting process, on previous process input and on the measurement data,
iii) determining a current process input which minimizes a desired process property, wherein the determining comprises minimizing the desired process property with respect to all allowed values of process inputs and utilizing constraints involving the current state of the melting process and a desired end state of the melting process, and
iv) controlling the melting process based on the current process input.

The above steps are preferably repeated, i.e. iterated, until the current state of the melting process is equal to or essentially equal to the desired end state of the melting process.

The iteration of the steps i-iv is in one embodiment made once every minute. It is also envisaged that the iteration of the steps i-iv can be made with longer intervals, for instance once every fifth minute, every tenth minute, or just at a very few instances during a melting cycle.

A process property is to be understood to mean e.g. a total power consumption of the melting process for one melting cycle or a total time of a melting cycle. A process property could also mean e.g. a total time until about 100% of the metal is in liquid form in the electric arc furnace.

In embodiments where the process property is the total power consumption of the melting process, the total power consumption can be minimized based on the following minimization problem.

$\min_u P_f^{tot}$ (loss function)

Subject to $x(k+1) = f_s(x(k), u(k), d(k))$ (state model of the melting process)

$x(t_f) = x_f$ (end condition/end state)

$x(0) = x_0$ (start condition/initial state)

$x_l \leq x \leq x_h$ $u_l \leq u \leq h_h$

Preferably, the above-described control process is arranged to generate a plurality of process inputs such as process inputs u1-u5 for controlling various process parameters, as has been described hereabove.

Furthermore there is provided a control system for controlling a melting process in an electrical arc furnace (EAF) for melting a metallic material, wherein the control system comprises:
a plurality of sensors 10, 14, 19, 22, 26, 33 arranged to sense respective process variables 61, 62, 63, 64, 65, 66 of the melting process, and
a processing unit arranged to:
receive the process variables sensed by the plurality of sensors;
determine a current state of the melting process based on a previous state of the melting process, on a previous process input and on the measurement data;

determine a current process input which minimizes a desired process property, wherein the determining comprises minimizing the desired process property with respect to all allowed values of process inputs and utilizing constraints involving the current state of the melting process and a desired end state of the melting process;

wherein the control system is arranged to control the melting process based on the current process input.

In particular the control system controls process parameters of the melting process. Such parameters can be controlled e.g. by means of the stirrer power supply unit 8 for controlling the electromagnetic stirrer, the electrode power supply unit 13, the oxygen flow control unit 16, the burner gas supply unit 17, and the solid material supply unit 20.

Although favorable the scope of the invention must not be limited by the embodiments presented but contain also embodiments obvious to a person skilled in the art.

What is claimed is:

1. A control system for controlling a melting process in an electrical arc furnace for melting a metallic material, comprising an electromagnetic stirrer for stirring the melt and a power supply unit arranged to supply power to the stirrer, characterized in that the control system comprises:
    a stirrer control unit, operatively connected to the power supply unit of the stirrer, for controlling the power supply in response to control values for the power supply to the stirrer,
    at least one sensor arranged to measure the power supply to the stirrer,
    a processing unit arranged to receive measured data regarding process variables from said at least one sensor arranged to measure the power supply to the stirrer and to:
        perform an optimization of the melting process with regard to time and/or energy consumption based on a predefined optimization problem including a state model of the melting process which relates process inputs, including power supply to the stirrer, to at least one state of the process, a loss function subject to said state model and an initial start condition,
        determine the state of the process based on said optimization problem using said initial start condition, and arranged to perform the following steps:
        determining reference values of a control signal for the power supply to the stirrer based on a result of the optimization,
        providing said reference values to the stirrer control unit for controlling the stirring of the metallic material,
        collecting measured data of at least one process variable reflecting the melting process,
        determining the current state of the process based on the state model, the determined previous state, and the determined previous control signal,
        determining a corrected current state of the process based on the measured data using a state observer,
        performing an optimization of the melting process with regard to time and/or energy consumption based on said optimization problem using the corrected current state as start condition for the optimization, and
        repeating the above steps during the process until a desired state of the process has been achieved.

2. The control system according to claim 1, comprising one or more electrodes for melting a metallic material and a power supply unit arranged to supply power to the electrodes, characterized in that the control system comprises:
    an electrode control unit, operatively connected to the power supply unit of the electrodes, for controlling the power supply in response to control values for the power supply to the electrodes,
    at least one further sensor arranged to measure the power supply to the electrodes,
    a processing unit arranged to receive measured data regarding said process variables from said at least one further sensor arranged to measure the power supply to the electrodes and to:
        perform an optimization of the melting process with regard to time and/or energy consumption based on a predefined optimization problem including a state model of the melting process which relates process inputs, including power supply to the electrodes, to at least one state of the process, a loss function subject to said state model and an initial start condition,
        determine the state of the process based on said optimization problem using said initial start condition, and arranged to perform the following steps:
        determining reference values of a control signal for the power supply to the electrodes based on a result of the optimization,
        providing said reference values to the electrode control unit for controlling the melting of the metallic material.

3. The control system according to claim 1, comprising wall or bottom mounted injection units arranged for supplying oxygen to the melt and a supply unit arranged to supply a flow of oxygen to the injection units, characterized in that the control system comprises:
    a flow control unit, operatively connected to the supply unit arranged to supply a flow of oxygen to the injection units, for controlling the flow of oxygen in response to control values for the oxygen supply to the injection units,
    at least one further sensor arranged to measure the oxygen supply to the injection units,
    a processing unit arranged to receive measured data regarding said process variables from said at least one further sensor arranged to measure the oxygen supply to the injection units and to:
        perform an optimization of the melting process with regard to time and/or energy consumption based on a predefined optimization problem including a state model of the melting process which relates process inputs, including oxygen supply to the injection units, to at least one state of the process, a loss function subject to said state model and an initial start condition,
        determine the state of the process based on said optimization problem using said initial start condition, and arranged to perform the following steps:
        determining reference values of a control signal for the control signal for the oxygen supply to the injection units based on a result of the optimization,
        providing said reference values to the flow control unit for controlling the oxygen supply to the injection units.

4. The control system according to claim 1, comprising at least one gas burner arranged for preheating solid metallic material, melting solid metallic material and for heating the melt, and a supply unit arranged to supply a flow of burner gas to the gas burner, characterized in that the control system comprises:

a flow control unit, operatively connected to the supply unit arranged to supply a flow of burner gas to the burner, for controlling the flow of burner gas in response to control values for the burner gas supply to the burner, at least one further sensor arranged to measure the burner gas supply to the burner, a processing unit arranged to receive measured data regarding said process variables from said at least one further sensor arranged to measure the burner gas supply to the burner and to:

perform an optimization of the melting process with regard to time and/or energy consumption based on a predefined optimization problem including a state model of the melting process which relates process inputs, including burner gas supply to the burner, to at least one state of the process, a loss function subject to said state model and an initial start condition, determine the state of the process based on said optimization problem using said initial start condition, and arranged to perform the following steps:

determining reference values of a control signal for the control signal for the burner gas supply to the burner based on a result of the optimization, providing said reference values to the flow control unit for controlling the flow of burner gas to the burner.

5. The control system according to claim 1, comprising at least one injection unit for adding carbon powder into the melt and a supply unit arranged to supply a flow of carbon powder to the melt, characterized in that the control system comprises:

a flow control unit, operatively connected to the supply unit arranged to supply carbon powder to the at least one injection unit for adding carbon powder into the melt, for controlling the flow of carbon powder in response to control values for the carbon powder supply to the at least one injection unit for adding carbon powder into the melt, at least one further sensor arranged to measure the supply of carbon powder to the at least one injection unit for adding carbon powder into the melt, a processing unit arranged to receive measured data regarding said process variables from said at least one further sensor arranged to measure the supply of carbon powder to the at least one injection unit for adding carbon powder into the melt and to:

perform an optimization of the melting process with regard to time and/or energy consumption based on a predefined optimization problem including a state model of the melting process which relates process inputs, including supply of carbon powder to the at least one injection unit for adding carbon powder into the melt, to at least one state of the process, a loss function subject to said state model and an initial start condition, determine the state of the process based on said optimization problem using said initial start condition, and arranged to perform the following steps:

determining reference values of a control signal for the control signal for the supply of carbon powder to the at least one injection unit for adding carbon powder into the melt based on a result of the optimization, providing said reference values to the flow control unit for controlling the flow of carbon powder to the at least one injection unit for adding carbon powder into the melt.

6. A control system for a melting process in an electric arc furnace for melting a metallic material, comprising:
at least one sensor;
an electromagnetic stirrer; and
a processing unit arranged to:
i) receive, from the at least one sensor, measurements of at least one process variable reflecting the melting process,
ii) determine a current state of the melting process based on a model of the melting process, a previous state of the melting process, a previous control input, and the measurements of the at least one process variable,
iii) determine a current process input which minimizes a desired process property, wherein the determining comprises minimizing the desired process property with respect to all allowed values of process inputs and utilizing constraints involving the current state of the melting process and a desired end state of the melting process, and
iv) control the melting process utilizing the current process input to control the electromagnetic stirrer.

7. The system according to claim 6, wherein the processing unit is further arranged to repeat i) to iv) until the desired end state of the melting process has been obtained.

8. The system according to claim 6, wherein the current process input is used to control an electrode power supply unit, an oxygen flow control unit, a burner gas supply unit, and a solid material supply unit.

9. The system according to claim 6, wherein the electric arc furnace comprises one or more electrodes for melting a metallic material, and the process inputs further includes power supply to the one or more electrodes.

10. The system according to claim 6, wherein the electric arc furnace comprises wall or bottom mounted injection units arranged for supplying oxygen to the melt, and the process inputs further includes oxygen supply to the injection units.

11. The system according to claim 6, wherein the electric arc furnace comprises at least one gas burner arranged for heating the melt, and the process inputs further includes burner gas supply to the gas burner.

12. The system according to claim 6, wherein the electric arc furnace comprises a carbon injection unit adding carbon powder into the melt, and the process inputs further includes carbon powder supply to the carbon injection unit.

13. The system according to claim 6, wherein the at least one process variable reflects a temperature of the melting process.

* * * * *